United States Patent
Kawai

(10) Patent No.: US 10,324,668 B2
(45) Date of Patent: Jun. 18, 2019

(54) INFORMATION PROCESSING METHOD TO BE PERFORMED BY INFORMATION PROCESSING APPARATUS CONFIGURED TO COMMUNICATE WITH COMMUNICATION APPARATUS USING PREDETERMINED COMMUNICATION METHOD

(71) Applicant: CANON KABUSHIKI KAISHA, Tokyo (JP)

(72) Inventor: Yu Kawai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/937,560

(22) Filed: Mar. 27, 2018

(65) Prior Publication Data
US 2018/0285039 A1  Oct. 4, 2018

(30) Foreign Application Priority Data
Mar. 31, 2017 (JP) ................. 2017-072376

(51) Int. Cl.
G06F 15/00 (2006.01)
G06F 3/12 (2006.01)
G06F 1/3234 (2019.01)
H04N 1/00 (2006.01)
H04W 4/80 (2018.01)

(52) U.S. Cl.
CPC .......... *G06F 3/1221* (2013.01); *G06F 1/3284* (2013.01); *G06F 3/1204* (2013.01); *G06F 3/1229* (2013.01); *G06F 3/1236* (2013.01); *G06F 3/1292* (2013.01); *H04N 1/00888* (2013.01); *H04W 4/80* (2018.02); *Y02D 10/1592* (2018.01)

(58) Field of Classification Search
CPC ....... G06F 3/1221; G06F 3/1236; H04W 4/80
USPC ........................................ 358/1.13
See application file for complete search history.

(56) References Cited

U.S. PATENT DOCUMENTS

2011/0299117 A1   12/2011 Hashimoto
2016/0191746 A1*   6/2016 Yokoyama ............. H04N 1/442
                                                358/1.14

FOREIGN PATENT DOCUMENTS

EP        2846524 A2   3/2015
JP        2017-10163 A   1/2017

* cited by examiner

*Primary Examiner* — Saeid Ebrahimi Dehkordy
(74) *Attorney, Agent, or Firm* — Canon U.S.A., Inc. IP Division

(57) ABSTRACT

An information processing method according to the present invention is performed by an information processing apparatus configured to communicate with a communication apparatus by a predetermined communication method, the communication apparatus being capable of communication by the predetermined communication method when in a first state or a second state having power consumption lower than that of the first state. In a case where information corresponding to second setting (in which the communication apparatus enters a third state not capable of the predetermined communication method is made) is obtained from the communication apparatus in the first state, the first setting (in which the communication apparatus enters the second state is made) is requested to be made.

21 Claims, 9 Drawing Sheets

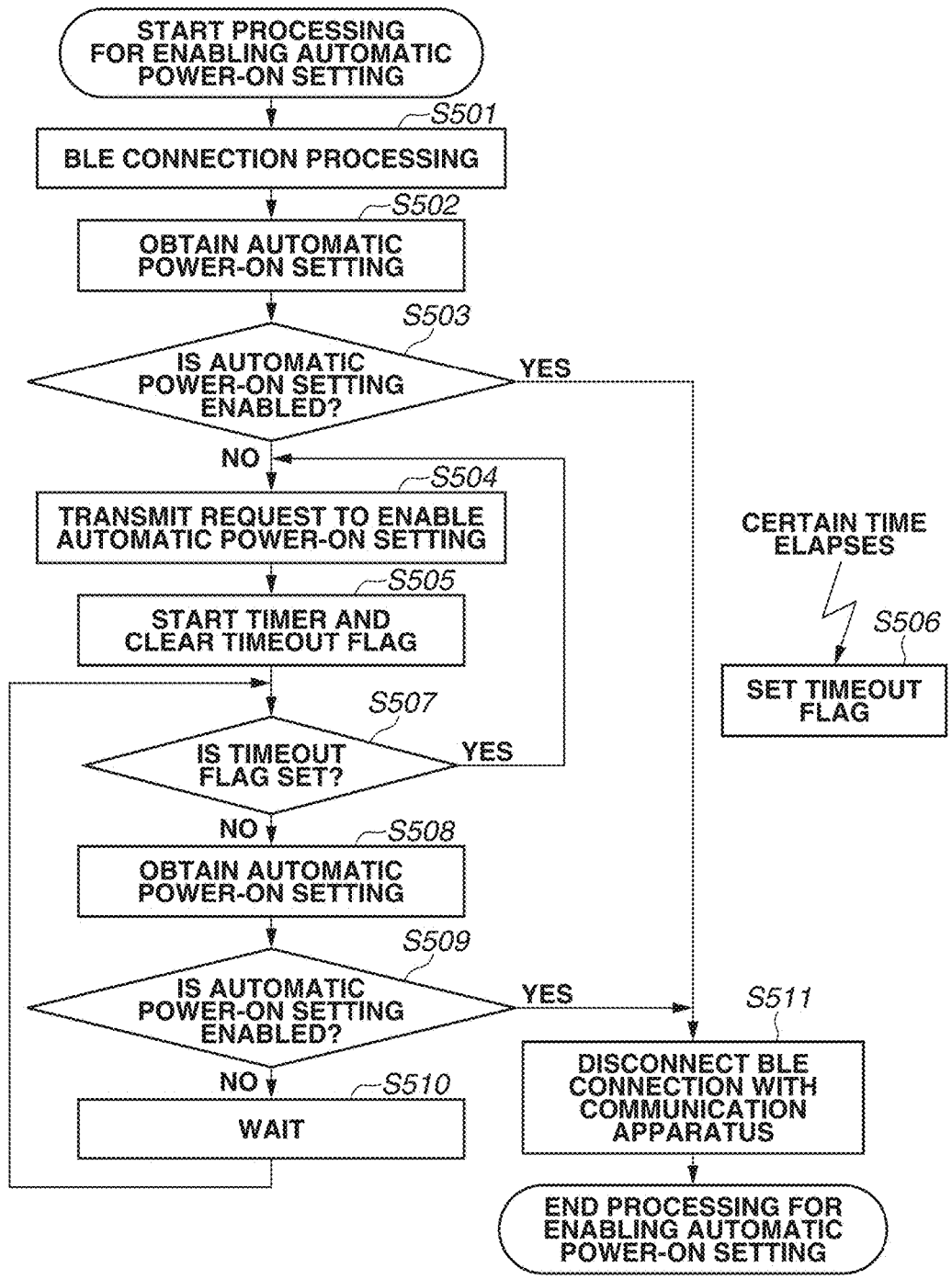

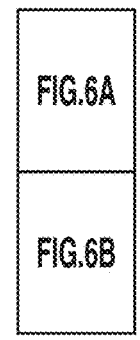
FIG.6
FIG.6A
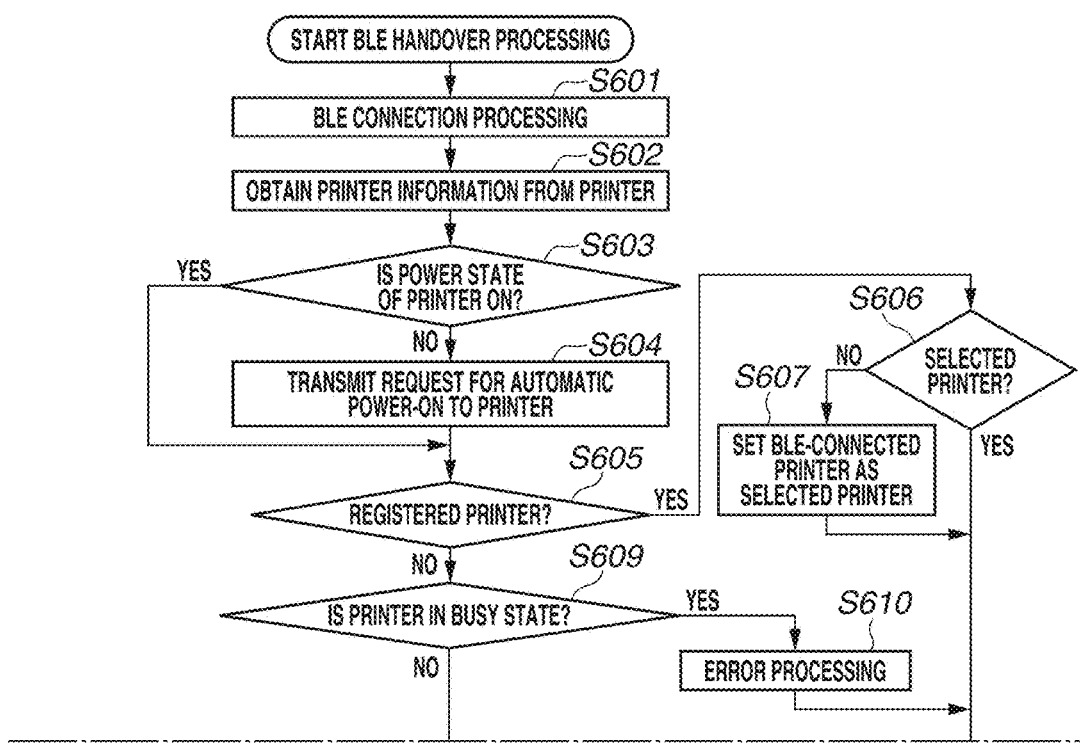

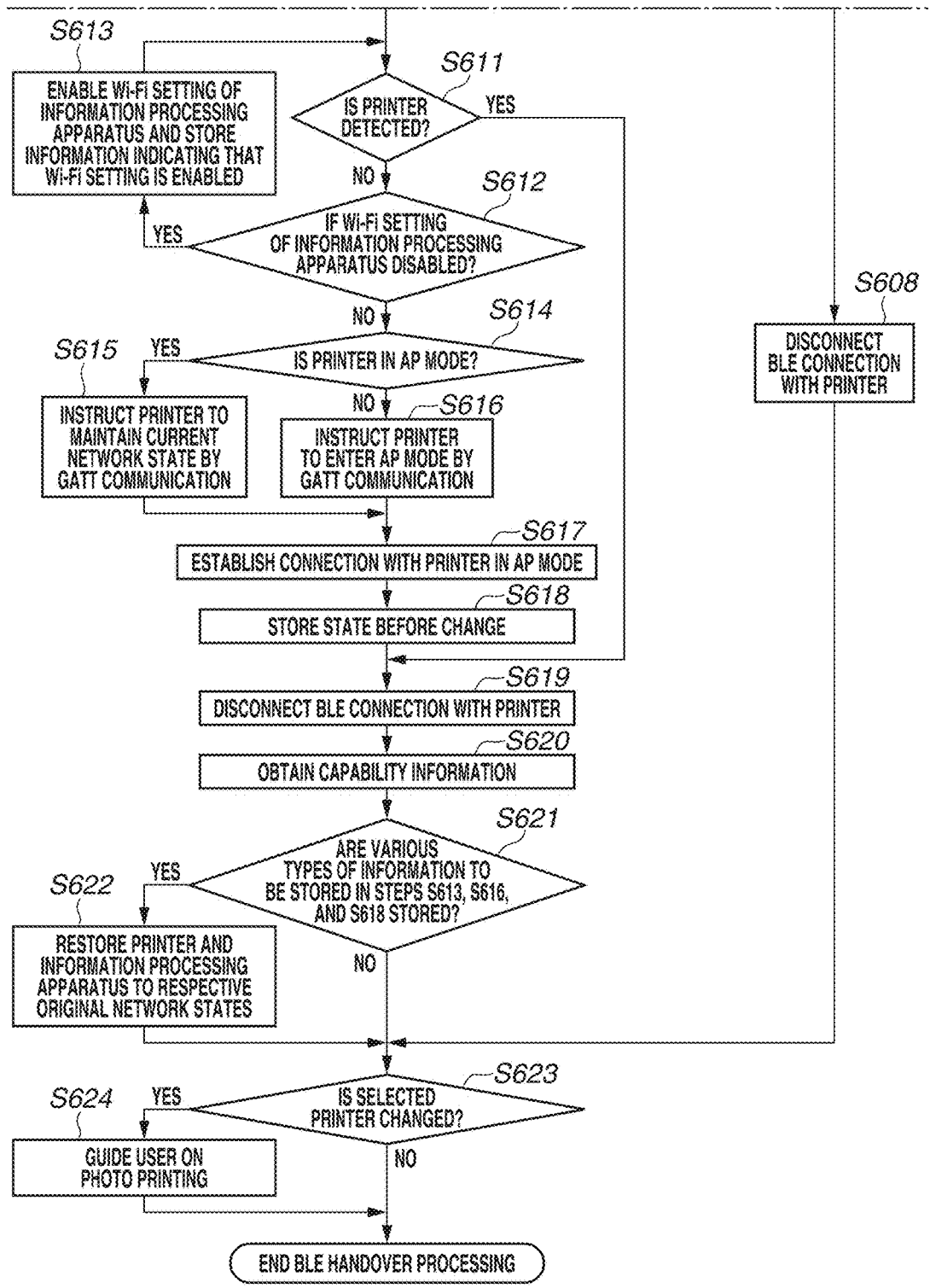

INFORMATION PROCESSING METHOD TO BE PERFORMED BY INFORMATION PROCESSING APPARATUS CONFIGURED TO COMMUNICATE WITH COMMUNICATION APPARATUS USING PREDETERMINED COMMUNICATION METHOD

BACKGROUND OF THE INVENTION

Field of the Invention

The present invention relates to an information processing method to be performed by an information processing apparatus configured to communicate with a communication apparatus by a predetermined communication method. The communication apparatus is capable of communication using the predetermined communication method when in a first state or a second state having power consumption lower than that of the first state.

Description of the Related Art

There have heretofore been techniques for automatically changing an operation state of an apparatus when the apparatus satisfies a predetermined condition. Japanese Patent Application Laid-Open No. 2017-10163 discusses an automatic power-on function for automatically bringing a printer into a power-on state if the printer in a power-off state receives data to be printed.

However, if the automatic power-on function of the apparatus such as discussed in Japanese Patent Application Laid-Open No. 2017-10163 is disabled and the user desires communication between the apparatus and an information processing apparatus, the desired communication is sometimes not possible due to the power-off state of the apparatus. In such a case, the user's operation such as a power-on is needed, and the desired communication can be difficult to perform.

SUMMARY OF THE INVENTION

The present invention has been achieved in view of the foregoing problem, and is directed to providing a technique for facilitating a user to establish communication between a communication apparatus and an information processing apparatus.

According to an aspect of the present invention, an information processing method according to the present invention is performed by an information processing apparatus configured to communicate with a communication apparatus by a predetermined communication method, the communication apparatus being capable of communication by the predetermined communication method when in a first state or a second state having power consumption lower than that of the first state. Information indicating whether a first setting in which the communication apparatus enters the second state when a predetermined state change occurs in the communication apparatus in the first state is made or a second setting in which the communication apparatus enters a third state not capable of the predetermined communication method is made is obtained from the communication apparatus in the first state by the predetermined communication method. In a case where the information corresponding to the second setting is obtained, the communication apparatus in the first state is requested to make the first setting by the predetermined communication method. In a case where the information corresponding to the first setting is obtained, the second setting is not requested to the communication apparatus by the information processing apparatus. In a case where the information corresponding to the second setting is obtained, the first setting is requested to be made.

Further features of the present invention will become apparent from the following description of exemplary embodiments with reference to the attached drawings.

BRIEF DESCRIPTION OF THE DRAWINGS

FIG. 5 is a flowchart of processing for enabling an automatic power-on setting of the communication apparatus.

FIG. 6 is a diagram including the flowcharts of FIGS. 6A and 6B illustrating processing for establishing a network connection by BLE communication and obtaining capability information about a printer.

DESCRIPTION OF THE EMBODIMENTS

An embodiment of the present invention will be described below with reference to the drawings. It should be understood, however, that appropriate changes and improvements made to the following embodiment based on ordinary knowledge of those skilled in the art without departing from the gist of the present invention are also covered by the scope of the present invention. Each of the embodiments of the present invention described below can be implemented solely or as a combination of a plurality of the embodiments or features thereof where necessary or where the combination of elements or features from individual embodiments in a single embodiment is beneficial.

An information processing apparatus and a communication apparatus included in a communication system according to the present embodiment will be described. In the present embodiment, the information processing apparatus is exemplified as a smartphone. However, this is not restrictive. Various apparatuses, including a mobile terminal, a notebook personal computer (PC), a tablet terminal, a personal digital assistant (PDA), and a digital camera, are also applicable. In the present embodiment, the communication apparatus is exemplified as a printer. However, this is not restrictive. Various apparatuses that can perform wireless communication with the information processing apparatus may be applied. Examples of applicable printers include an inkjet printer, a full color laser beam printer, and a monochrome printer. Aside from printers, a copying machine, a facsimile apparatus, a mobile terminal, a smartphone, a notebook PC, a tablet terminal, a PDA, a digital camera, a music reproduction device, and a television set are also applicable. In addition, a multifunction peripheral having a plurality of functions including a copy function, a facsimile (FAX) function, and a print function is also applicable.

Figure 1:
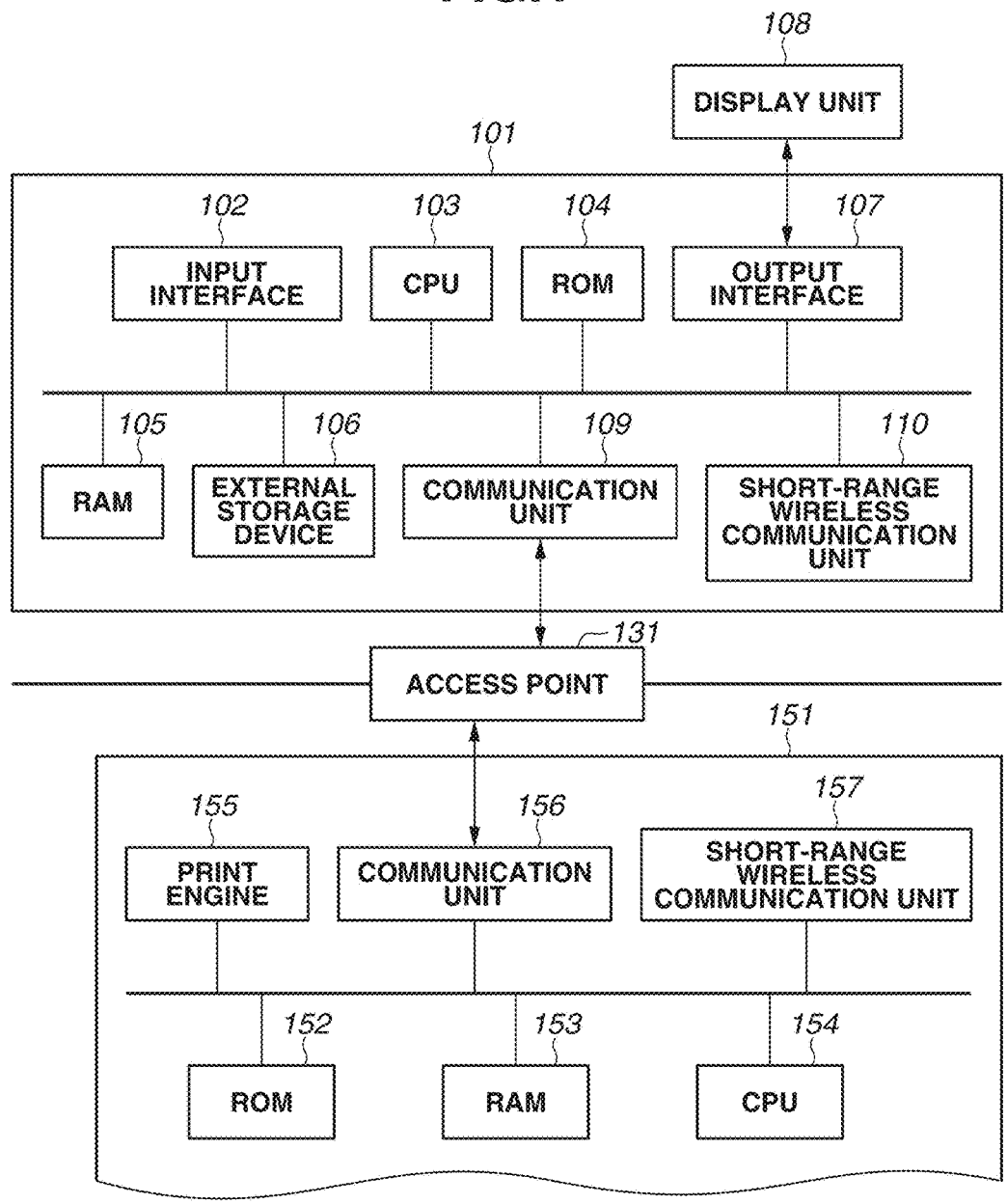
FIG. 1 is a diagram illustrating an example of a configuration of an information processing apparatus and a communication apparatus according to an exemplary embodiment.

A configuration of the information processing apparatus according to the present embodiment and the communication apparatus capable of communication with the information processing apparatus according to the present embodiment will initially be described with reference to the block diagram of FIG. 1. While the present embodiment is described by using the following configuration as an example, the present embodiment is applicable to an apparatus that can communicate with a communication apparatus, and the functions are not limited to those of the diagram in particular.

An information processing apparatus 101 is the information processing apparatus according to the present embodiment. The information processing apparatus 101 includes an input interface 102, a central processing unit (CPU) 103, a read-only memory (ROM) 104, a random access memory (RAM) 105, an external storage device 106, an output interface 107, a display unit 108, a communication unit 109, and a short-range wireless communication unit 110.

The input interface 102 is an interface for accepting a data input and operation instructions from a user. The input interface 102 may include a physical keyboard, a button, and/or a touch panel, for example. The output interface 107 to be described below and the input interface 102 can be configured as an identical component so that a screen output and the acceptance of operations from the user are performed by the same component.

The CPU 103 is a system control unit and controls the entire information processing apparatus 101.

The ROM 104 stores static data, such as control programs to be executed by the CPU 103, a data table, and a built-in operating system (OS) program. In the present embodiment, the control programs stored in the ROM 104 perform software execution control, such as scheduling, task switching, and interrupt processing, under management of the built-in OS program stored in the ROM 104.

The RAM 105 includes a static RAM (SRAM) which needs a backup power supply. The RAM 105 retains data by using a not-illustrated primary battery for data backup, and can thus store important data, such as a program control variable, in a nonvolatile manner. A memory area for storing setting information about the information processing apparatus 101 and management data of the information processing apparatus 101 is also provided in the RAM 105. The RAM 105 is also used as a main memory and a work memory of the CPU 103.

The external storage device 106 stores an application for providing a print execution function and a print information generation program for generating print information interpretable by a communication apparatus 151. The external storage device 106 also stores various programs and various types of information used by the programs. The various programs include an information transmission and reception control program for performing transmission and reception with the communication apparatus 151 connected via the communication unit 109.

The output interface 107 is an interface for performing control for the display unit 108 to display data and make a notification of a state of the information processing apparatus 101.

The display unit 108 includes a light-emitting diode (LED) and a liquid crystal display (LCD), and displays data and makes a notification of the state of the information processing apparatus 101. A software keyboard including keys, such as a numerical value input key, a mode setting key, a determination key, a cancel key, and a power key may be provided on the display unit 108 to accept inputs from the user via the display unit 108.

The communication unit 109 is a component for connecting to an apparatus, such as the communication apparatus 151, and performing data communication. For example, the communication unit 109 can connect to an access point (not illustrated) in the communication apparatus 151. The connection between the communication unit 109 and the access point in the communication apparatus 151 enables mutual communication between the information processing apparatus 101 and the communication apparatus 151. The communication unit 109 may communicate directly with the communication apparatus 151 by wireless communication. The communication unit 109 may communicate via an external access point (access point 131) lying outside the information processing apparatus 101 and the communication apparatus 151. Examples of wireless communication methods include Wireless Fidelity (Wi-Fi) (registered trademark) and Bluetooth (registered trademark). Examples of the access point 131 include a device such as a wireless local area network (LAN) router. In the present embodiment, a method in which the information processing apparatus 101 and the communication apparatus 151 are directly connected without an external access point will be referred to as a direct connection method. A method in which the information processing apparatus 101 and the communication apparatus 151 are connected via an external access point will be referred to as an infrastructure connection method.

The short-range wireless communication unit 110 is a component for establishing a wireless connection with an apparatus such as the communication apparatus 151 over a short distance and performing data communication. The short-range wireless communication unit 110 performs communication by a communication method different from that of the communication unit 109. The short-range wireless communication unit 110 can connect to a short-range wireless communication unit 157 in the communication apparatus 151. In the present embodiment, Bluetooth Low Energy (BLE) is used as a predetermined communication method of the short-range wireless communication unit 110.

The communication apparatus 151 is the communication apparatus according to the present embodiment. The communication apparatus 151 includes a ROM 152, a RAM 153, a CPU 154, a print engine 155, a communication unit 156, and the short-range wireless communication unit 157.

The communication unit 156 includes an access point for establishing a connection with an apparatus such as the information processing apparatus 101, as an access point inside the communication apparatus 151. The access point can connect to the communication unit 109 of the information processing apparatus 101. The communication unit 156 may communicate directly with the information processing apparatus 101 by wireless communication. The communication unit 156 may communicate via the access point 131. Examples of communication methods include Wi-Fi (registered trademark) and Bluetooth (registered trademark). The communication unit 156 may include hardware that functions as an access point. The communication unit 156 may operate as an access point by using software for operating as an access point.

The short-range wireless communication unit 157 is a component for establishing a wireless connection with an apparatus such as the information processing apparatus 101 over a short distance. In the present embodiment, BLE is used as a communication method of the short-range wireless communication unit 157.

The RAM 153 includes an SRAM which needs a backup power supply. The RAM 153 retains data by using a not-illustrated primary battery for data backup, and can thus store important data, such as a program control variable, in a nonvolatile manner. A memory area for storing setting information about the communication apparatus 151 and management data of the communication apparatus 151 is also provided in the RAM 153. The RAM 153 is also used as a main memory and a work memory of the CPU 154. The RAM 153 stores a communication buffer for temporarily storing print information received from the information processing apparatus 101, and various types of information.

The ROM 152 stores static data such as control programs to be executed by the CPU 154, a data table, and an OS program. In the present embodiment, the control programs stored in the ROM 152 perform software execution control, such as scheduling, task switching, and interrupt processing, under management of the built-in OS program stored in the ROM 152.

The CPU 154 is a system control unit and controls the entire communication apparatus 151.

The print engine 155 forms an image on a recording medium, such as paper, by using a recording agent, such as ink, to output a print result, based on information stored in the RAM 153 and a print job received from the information processing apparatus 101. Since the print job transmitted from the information processing apparatus 101 includes a large amount of transmission data and needs high-speed communication, the print job here is received via the communication unit 156 which can communicate at higher speed than the short-range wireless communication unit 157.

A not-illustrated power key is provided on the communication apparatus 151. If the user presses the power key, the state of the communication apparatus 151 can be switched between a power-off state and a power-on state. The communication apparatus 151 has an automatic power-off function and an automatic power-on function to be described below. The user can individually set whether to enable or disable the respective functions. If the automatic power-off function is enabled, the communication apparatus 151 automatically enters the power-off state when a predetermined condition is satisfied, without the power key being pressed. Examples of the predetermined condition include when the communication apparatus 151 is not used for a predetermined time. On the other hand, if the automatic power-on function is enabled, the communication apparatus 151 automatically enters the power-on state when a predetermined condition is satisfied, without the power key being pressed. Examples of the predetermined condition include when the communication apparatus 151 receives data.

A memory such as an external hard disk drive (HDD) and a Secure Digital (SD) card may be mounted as an optional device on the communication apparatus 151. Information to be stored in the communication apparatus 151 may be stored in the memory. The communication apparatus 151 according to the present embodiment has a connection mode which is set by connection setting processing, and performs communication with the information processing apparatus 101 in a connection configuration based on the set communication mode. If the communication apparatus 151 according to the present embodiment performs communication by infrastructure connection, an infrastructure connection mode is set as the connection mode. If the communication apparatus 151 according to the present embodiment performs communication by direct connection, a direct connection mode is set as the connection mode.

While the distribution of processing between the information processing apparatus 101 and the communication apparatus 151 has been described as above by way of example, such a mode of distribution is not restrictive. The processing can be distributed in different ways.

In the present embodiment, the information processing apparatus 101 stores a predetermined application in the ROM 104 or the external storage device 106. An example of the predetermined application is an application program for transmitting a print job for printing image data or document data stored in the information processing apparatus 101 to the communication apparatus 151. An application having such a function will hereinafter be referred to as a print application. For example, the print application may also include a function or functions other than a print function. For example, if the communication apparatus 151 has a scan function, the print application may include a function of scanning a document set on the communication apparatus 151, a function of making other settings about the communication apparatus 151, and a function of checking the state of the communication apparatus 151. In other words, the print application may include a function of transmitting a scan job or a setting job to the communication apparatus 151, aside from a print job. The print application can obtain capability information about the communication apparatus 151 via the communication unit 109 of the information processing apparatus 101 and the communication unit 156 of the communication apparatus 151. The capability information is ability information about the communication apparatus 151. For example, if the communication apparatus 151 has a print function, the size of a sheet to be printed and the type of sheet apply to the capability information. The print application displays the obtained capability information on the display unit 108 of the information processing apparatus 101, and the user can select the size of a sheet and the type of sheet to be used for printing from the capability information. The print application generates a print job by using the size of the sheet and the type of sheet selected by the user. The capability information may include information unique to the communication apparatus 151, such as a media access control (MAC) address of the communication apparatus 151. A plurality of communication apparatuses 151 may be registered in the print application. In such a case, a plurality of pieces of capability information about the respective communication apparatuses 151 (referred to as registered apparatuses) can be stored in the ROM 104 or the external storage device 106 of the information processing apparatus 101. The user can select an arbitrary one (referred to as a selected apparatus) from a list of the registered apparatuses via a user interface (UI) of the print application. Printing is performed on the selected apparatus. If the communication apparatus 151 is a printer, a registered apparatus and a selected apparatus are referred to as a registered printer and a selected printer, respectively. However, the communication apparatus 151 is not limited to a printer.

In the present embodiment, the short-range wireless communication units 110 and 157 will be described to communicate by BLE. In the present embodiment, the short-range wireless communication unit 157 of the communication apparatus 151 functions as an advertiser (or slave) which broadcasts advertising information to be described below. The short-range wireless communication unit 110 functions as a scanner (or master) which receives advertising information. The communication units 109 and 156 will be described to communicate via a wireless LAN (Wi-Fi). Now, processing for transmitting advertising information and receiving a BLE connection request according to the BLE standard will be described.

In the present embodiment, as described above, the short-range wireless communication unit 157 of the communication apparatus 151 operates as a slave device. The foregoing processing is therefore performed by the short-range wireless communication unit 157. The short-range wireless communication unit 157 performs communication by dividing the 2.4-GHz frequency band into 40 channels (0 to 39 ch). Of these, the short-range wireless communication unit 157 uses the 37th to 39th channels for the transmission of advertising information and the reception of a BLE connection request, and uses the 0th to 36th channels for data communication after a BLE connection.

Figure 2:
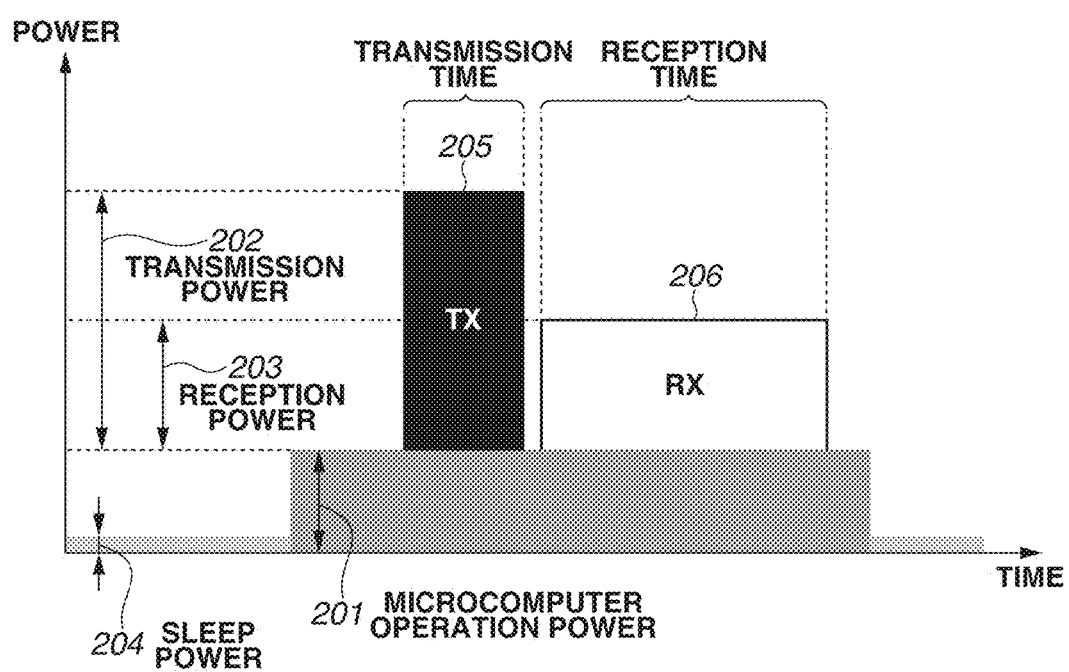
FIG. 2 is a diagram for describing processing for broadcasting advertising information and receiving connection request information.

FIG. 2 illustrates power consumption of the short-range wireless communication unit 157 process by process in transmitting advertising information by using one channel. The vertical axis of FIG. 2 indicates the power consumption, and the horizontal axis indicates time. Transmission processing, or processing for broadcasting advertising information, has a total power consumption Tx 205. Reception processing, or processing for maintaining a receiver for receiving a BLE connection request active, has a total power consumption Rx 206. Transmission power 202 represents instantaneous power consumption by the transmission processing. Reception power 203 represents instantaneous power consumption by the reception processing. Microcomputer operation power 201 represents instantaneous power consumption when a microcomputer in the short-range wireless communication unit 157 is running. The microcomputer is running even before, after, and between Tx 205 and Rx 206 because the microcomputer needs to be activated in advance to perform and stop the transmission processing and the reception processing. If advertising information is transmitted by a plurality of channels, the power consumption increases as much as the number of channels transmitting the advertising information. When the microcomputer is not running and the short-range wireless communication unit 157 is in a power saving state, the instantaneous power consumption of the short-range wireless communication unit 157 is sleep power 204. In such a manner, the short-range wireless communication unit 157 performs the transmission processing by using a predetermined channel, and then performs the reception processing for a certain time by using the same channel to wait for the transmission of a BLE connection request from the information processing apparatus 101.

Figure 3:
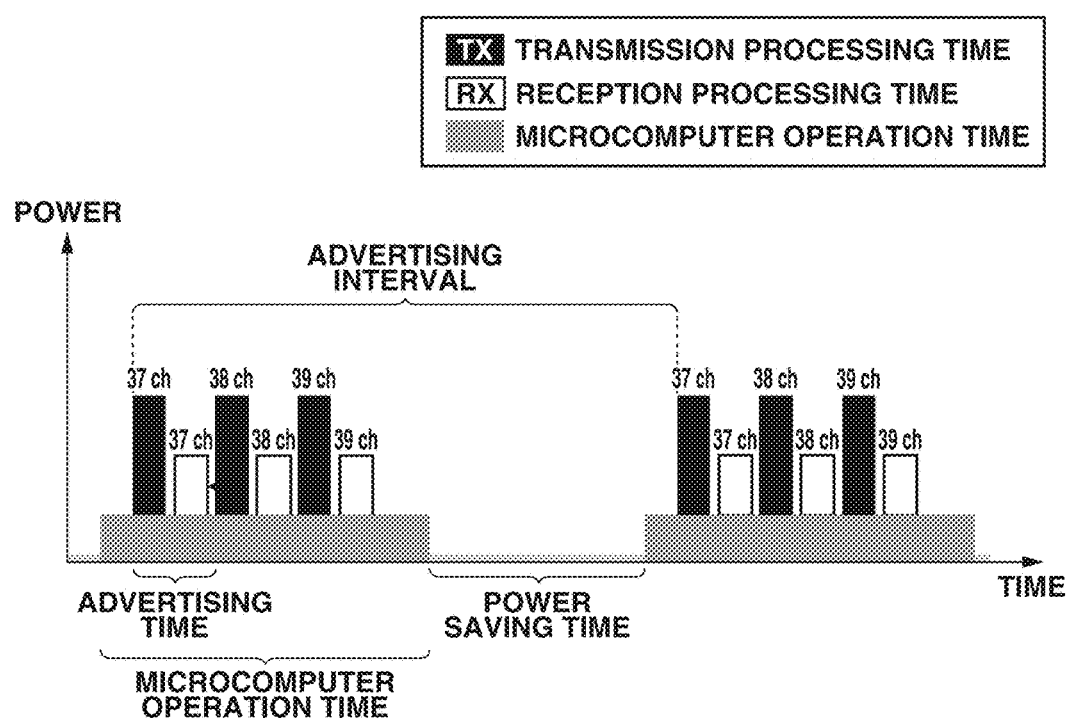
FIG. 3 is a diagram for describing Bluetooth Low Energy (BLE) advertising.

As illustrated in FIG. 3, the short-range wireless communication unit 157 repeats the transmission processing of the advertising information and the reception processing three times channel by channel before stopping the operation of the microcomputer to enter the power saving state for a predetermined time. The combination of the transmission processing of the advertising information and the reception processing by a predetermined channel will hereinafter be referred to as advertising. A time interval at which the advertising information is transmitted by a predetermined channel will be referred to as an advertising interval. The number of times to repeat the advertising from the first advertising to the power saving state may be arbitrarily changed from three to a smaller number.

Upon start of power supply, the short-range wireless communication unit 157 performs initialization processing and enters an advertising state. Entering the advertising state, the short-range wireless communication unit 157 broadcasts advertising information around. The advertising information refers to a signal including basic header information (identification information for identifying the apparatus transmitting the advertising information). For example, if the communication apparatus 151 is a printer, the advertising information includes an Internet Protocol (IP) address of the printer, a port to be used for printing, information indicating a specific print service, and information about the transmission power of the advertising information.

If the short-range wireless communication unit 110 of the information processing apparatus 101 receives the advertising information, the short-range wireless communication unit 110 issues a scan request to the short-range wireless communication unit 157. In response to the scan request, the short-range wireless communication unit 157 of the communication apparatus 151 transmits identification information (universally unique identifier (UUID)) about the communication apparatus 151 and information about the functions and hardware of the communication apparatus 151 as a scan response. After the information processing apparatus 101 receives the scan response, pairing and Generic Attribute Profile (GATT) communication to be described below are started.

In the present embodiment, the information processing apparatus 101 and the communication apparatus 151 perform authentication therebetween, and perform pairing processing for reading and writing data by GATT communication between the apparatuses. GATT is a profile for governing the reading and writing (transmission and reception) of information according to the BLE standard. GATT communication refers to communication in which the information processing apparatus 101 plays the role of a GATT client and the communication apparatus 151 plays the role of a GATT server, and the information processing apparatus 101 reads and writes information from/to the communication apparatus 151 according to a GATT-based profile. The communication apparatus 151 is configured to not permit the reading and writing of information by GATT communication in a state where pairing between the information processing apparatus 101 and the communication apparatus 151 is not performed. This can prevent the information processing apparatus 101 and the communication apparatus 151 not paired up from performing communication so that, for example, information stored in the communication apparatus 151 is inadvertently obtained by the not-paired information processing apparatus 101. In the present embodiment, there are a GATT communication to be permitted without pairing and a GATT communication to not be permitted without pairing. Convenience of communication can be improved by allowing communication of less confidential information by the GATT communication permitted without pairing. Communication security can be improved by allowing communication of highly confidential information only by the GATT communication not permitted without pairing.

Details of the pairing processing will be described. Initially, if the foregoing print application is activated and the information processing apparatus 101 accepts an execution instruction for the pairing processing from the user via the print application, the information processing apparatus 101 starts to search for advertising information including specific apparatus information. Examples of the specific apparatus information include the UUID and MAC address of an apparatus (printer) corresponding to the print application. If the information processing apparatus 101 receives advertising information including the specific apparatus information, the information processing apparatus 101 displays on the display unit 108 a list of apparatuses transmitting the advertising information including the specific apparatus information, and accepts the user's selection of an apparatus to be paired. The following description is given on the assumption that the communication apparatus 151 is selected.

Figure 4A:
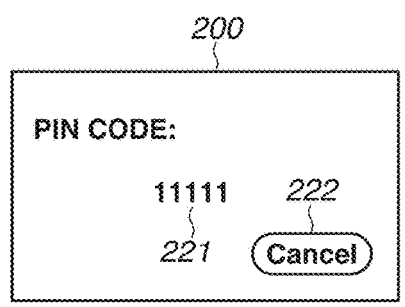
FIGS. 4A and 4B are diagrams illustrating screens related to pairing processing.
Figure 4B:
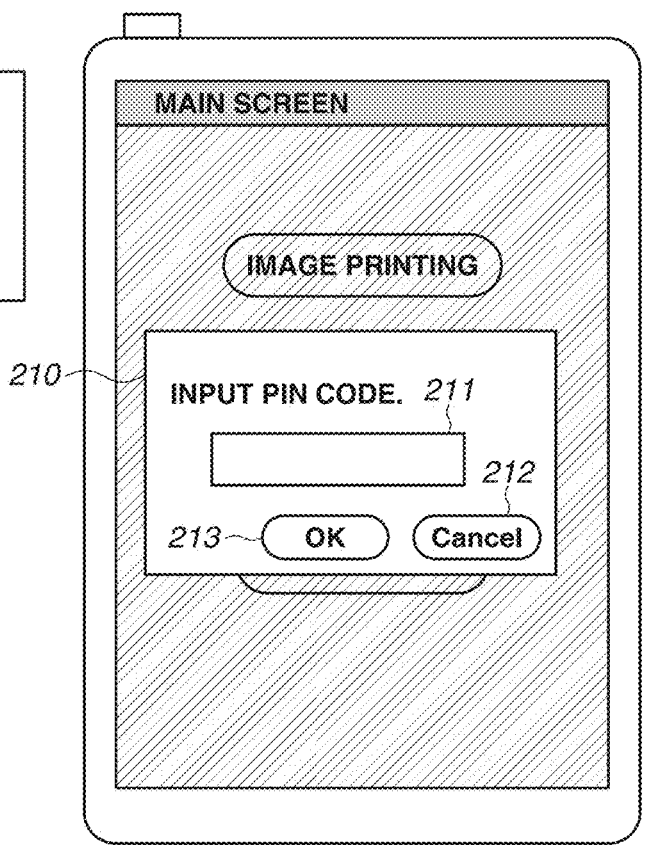

If the information processing apparatus 101 accepts the selection of the apparatus to be paired, the information processing apparatus 101 transmits a pairing request to the communication apparatus 151 by communication according to the Security Manager Protocol. The apparatuses 101 and 151 communicate by using the Security Manager Protocol until the pairing ends. Receiving the pairing request, the communication apparatus 151 displays a personal identification number (PIN) code display screen 200 such as illustrated in FIG. 4A on a display unit of the communication apparatus 151. The PIN code display screen 200 displays a PIN code 221 and a cancel button 222 for cancelling the pairing processing. Transmitting the pairing request, the information processing apparatus 101 displays a PIN code input screen 210 such as illustrated in FIG. 4B on the display unit 108. The PIN code input screen 210 includes a PIN code input area 211 for accepting input of the PIN code 221 by the user, and an OK button 213 for transmitting the input PIN code 221 to the communication apparatus 151. The PIN code input screen 210 further includes a cancel button 212 for cancelling the pairing processing. If the OK button 213 is pressed with the PIN code 221 input to the PIN code input area 211, the information processing apparatus 101 transmits information including the input PIN code 221 to the communication apparatus 151. The communication apparatus 151 determines whether the PIN code 221 included in the received information coincides with the PIN code 221 displayed on the PIN code display screen 200. If the PIN codes 221 are determined to coincide, the communication apparatus 151 permits the information processing apparatus 101 pairing. Specifically, the communication apparatus 151 exchanges a link key generated from the PIN code 221 by a predetermined method with the information processing apparatus 101 by the Security Manager Protocol (SMP) of the BLE standard. The exchanged link key is stored both in a storage area (such as the RAM 105) of the information processing apparatus 101 and in a storage area (such as the RAM 153) of the communication apparatus 151. The pairing is thereby completed, and the apparatuses 101 and 151 are permitted to perform BLE communication therebetween. After the completion of the pairing, the communication apparatus 151 hides the PIN code display screen 200 and displays the original screen again.

After the completion of the pairing, the information processing apparatus 101, when transmitting a GATT communication request to the communication apparatus 151, notifies the communication apparatus 151 of the link key stored in the storage area during the pairing processing. If the communication apparatus 151 receives the GATT communication request, the communication apparatus 151 compares the link key stored in the storage area during the pairing processing with the notified link key to check whether the apparatus originating the GATT communication request is the paired one. If the originating apparatus is confirmed to be the paired one, the communication apparatus 151 starts reading and writing of information by GATT communication with the information processing apparatus 101. In such a manner, once the information processing apparatus 101 completes the pairing processing with the communication apparatus 151, the successfully-authenticated link key is stored in both the information processing apparatus 101 and the communication apparatus 151. Subsequent pairing is then performed by using the stored link keys, and the GATT communication with the communication apparatus 151 can be performed without the user inputting the PIN code 221. In the foregoing description, the PIN code 221 displayed on the PIN code display screen 200 is described to be input to the PIN code input area 211 by the user. However, such a mode is not restrictive. For example, the PIN code may be fixed information (not arbitrarily changeable by the user) and may be stored into the information processing apparatus 101 when the print application is installed. The PIN code may then be notified to the communication apparatus 151 without the user's input. The start timing of the pairing processing is not limited to the foregoing, either. For example, the pairing processing may be started at timing when the user gives an instruction for printing via the print application, or at timing before a BLE connection is established in the connection setting processing.

The PIN code input screen 210 displayed by the information processing apparatus 101 does not need to be displayed by the print application. For example, the information processing apparatus 101 may include a setting application. The setting application is an application program for making settings about a function or functions to be performed by the OS. Examples of the setting application include an application program installed together in a series of processes when the OS is installed on the information processing apparatus 101, and one preinstalled on the information processing apparatus 101 with the OS when the information processing apparatus 101 arrives. When the information processing apparatus 101 performs pairing with the communication apparatus 151, the information processing apparatus 101 may activate the setting application to shift the print application to the background, and accept the user's input for pairing to a Bluetooth setting screen displayed by the setting application.

Receiving the advertising information from the short-range wireless communication unit 157, the information processing apparatus 101 can transmit a BLE connection request to the communication apparatus 151 and perform a BLE connection with the communication apparatus 151. A BLE connection refers to establishing a state in which the apparatuses 101 and 151 can perform short-range wireless communication processing therebetween by using the GATT profile.

When the communication apparatus 151 is in the power-on state, the short-range wireless communication unit 157 is supplied with power and the short-range wireless communication unit 110 becomes able to communicate with the short-range wireless communication unit 157. That is, in the present embodiment, the short-range wireless communication units 110 and 157 become able to communicate by BLE. Even if the power of the communication apparatus 151 is off, the short-range wireless communication units 110 and 157 can establish a BLE connection as long as the power supply to the short-range wireless communication unit 157 is maintained. An example of a method for allowing a BLE connection even with the communication apparatus 151 powered off is to enable an automatic power-on setting of the communication apparatus 151. The automatic power-on setting is a setting about the foregoing automatic power-on function. If the automatic power-on setting is enabled, power is supplied to the short-range wireless communication unit 157, the communication unit 156, and the ROM 152 even when the power of the communication apparatus 151 is off.

If the automatic power-on setting is enabled, the short-range wireless communication unit 157 enters the advertising state. The short-range wireless communication units 110 and 157 are therefore capable of a BLE connection even with the communication apparatus 151 powered off. On the other hand, if the automatic power-on setting is disabled, the short-range wireless communication units 110 and 157 are not capable of a BLE connection when the power of the communication apparatus 151 is off. In other words, whether a BLE connection can be established with the communication apparatus 151 powered off depends on the automatic power-on setting. For example, if the user of the information processing apparatus 101 desires to establish a BLE connection when the communication apparatus 151 is in the powered-off state, the user then needs to make an operation of approaching the communication apparatus 151 and pressing the power key to bring the communication apparatus 151 into the power-on state.

The user can enable and disable the automatic power-on setting by giving instructions on the operation panel of the communication apparatus 151. However, even in such a case, the user of the information processing apparatus 101 needs to change the automatic power-on setting by approaching the communication apparatus 151 and operating the operation panel.

In view of this, in the present embodiment, the information processing apparatus 101 automatically enables the automatic power-on setting of the communication apparatus 151 by BLE communication. As a result, unless an operation for disabling the automatic power-on setting has been made, the automatic power-on setting is enabled when BLE communication is performed next time. In such a case, even if the power of the communication apparatus 151 is off, the short-range wireless communication unit 157 enters the advertising state and can shift to the power-on state according to subsequent GATT communication. The user of the information processing apparatus 101 can thus easily establish a BLE connection between the communication apparatus 151 and the information processing apparatus 101 without operating the operation panel of the communication apparatus 151 when the communication apparatus 151 is in the power-off state. The processing according to the present embodiment will be described in detail below.

Processing of the information processing apparatus 101 according to the present embodiment will be described with reference to the flowchart illustrated in FIG. 5. In the present embodiment, the information processing apparatus 101 performs processing for enabling the automatic power-on setting of the communication apparatus 151 after the completion of pairing. The processing illustrated in FIG. 5 is implemented by the CPU 103 executing programs stored in the ROM 104, such as the print application and the OS, on the RAM 105 serving as a work memory.

In step S501, the information processing apparatus 101 performs BLE connection processing to perform GATT communication between the information processing apparatus 101 and the communication apparatus 151. In step S502, the information processing apparatus 101 obtains the automatic power-on setting from the communication apparatus 151 by the GATT communication established between the information processing apparatus 101 and the communication apparatus 151 by the BLE communication processing in step S501. The information processing apparatus 101 then stores the obtained automatic power-on setting into the RAM 105. In step S503, the information processing apparatus 101 determines whether the automatic power-on setting of the communication apparatus 151, obtained in step S502 is enabled or disabled.

In step S503, if the automatic power-on setting is determined to be disabled (NO in step S503), the processing proceeds to step S504. In step S504, the information processing apparatus 101 transmits a request to enable the automatic power-on setting to the communication apparatus 151 by the GATT communication with the communication apparatus 151. By the transmission processing of step S504, the request is written to the short-range wireless communication unit 157 of the communication apparatus 151.

In step S503, in a case where the automatic power-on setting of the communication apparatus 151 is determined to be already enabled (YES in step S503), the processing proceeds to step S511. In step S511, the information processing apparatus 101 disconnects the BLE connection, and ends the processing for enabling the automatic power-on setting illustrated in FIG. 5. Alternatively, even in a case where the automatic power-on setting of the communication apparatus 151 is already enabled (YES in step S503), the processing may proceed to step S504 to transmit a request to enable the automatic power-on setting.

The communication apparatus 151 receives the request transmitted in step S504, and updates the automatic power-on setting stored in the RAM 153 to enabled. Meanwhile, after the writing for enabling the automatic power-on setting in step S504, the information processing apparatus 101 performs confirmation processing for confirming by the GATT communication that the automatic power-on setting of the communication apparatus 151 is normally updated. If the automatic power-on setting of the communication apparatus 151 is not confirmed to be enabled even after a lapse of a certain time from the writing in step S504, the information processing apparatus 101 performs the processing for writing the automatic power-on setting again. Such processing will be described by using step S505 and subsequent steps.

In step S505, the information processing apparatus 101 initializes a timeout flag and starts counting of a timer before the foregoing confirmation processing. The timeout flag is a value that is stored in the RAM 105 and indicates a lapse of a predetermined time (timeout) of the timer. The timeout flag is not updated (set) to a value indicating the occurrence of a timeout until the timeout occurs. The counting of the timer is performed by the CPU 103.

If the request is normally transmitted to the communication apparatus 151, the communication apparatus 151 updates the automatic power-on setting within a certain time. If the automatic power-on setting is not updated even after a lapse of the certain time, the request may have failed to be normally transmitted. A timeout time is therefore set in the information processing apparatus 101, and if a timeout occurs, the information processing apparatus 101 transmits the request to enable the automatic power-on setting again. The automatic power-on setting of the communication apparatus 151 can thus be enabled with reliability.

In step S506, in a case where a certain time elapses after the start of the timer in step S505, the information processing apparatus 101 sets the timeout flag by interrupt processing.

In step S507, the information processing apparatus 101 determines whether the timeout flag is set. In step S507, in a case where the timeout flag is determined to not be set (NO in step S507), the processing proceeds to step S508. In a case where the timeout flag is set (YES in step S507), the processing returns to step S504.

In step S508, after the start of counting of the timer, the information processing apparatus 101 obtains the setting value of the automatic power-on setting of the communication apparatus 151 by GATT communication between the information processing apparatus 101 and the communication apparatus 151. In step S509, the information processing apparatus 101 determines whether the automatic power-on setting of the communication apparatus 151 is enabled or disabled, based on the automatic power-on setting of the communication apparatus 151 obtained in step S508. The method for obtaining the automatic power-on setting in step S508 and the method of determination in step S509 are similar to those of steps S502 and S503, respectively.

In step S509, in a case where the automatic power-on setting is determined to be disabled (NO in step S509), the processing proceeds to step S510. In step S510, the information processing apparatus 101 waits until a predetermined time elapses. The predetermined time for which the information processing apparatus 101 waits in step S510 is a time shorter than the time at which the timeout flag is set in step S506. Even in a case where the automatic power-on setting is determined to be disabled in step S509, the information processing apparatus 101 can therefore perform the processing of steps S508 and S509 a plurality of times until the timeout flag is set afterward.

If the automatic power-on setting of the communication apparatus 151 has been changed to enabled by the request to enable the automatic power-on setting in step S504, the determination in step S509 is YES. In such a case (YES in step S509), the processing proceeds to step S511. In step S511, the information processing apparatus 101 disconnects the BLE connection, and ends the processing for enabling the automatic power-on setting illustrated in FIG. 5. In other words, the information processing apparatus 101 ends the processing illustrated in FIG. 5 if the automatic power-on setting of the communication apparatus 151 is confirmed to be enabled during the confirmation processing after the transmission of the foregoing enabling request.

In the present embodiment, the information processing apparatus 101 determines whether to transmit the request to enable the automatic power-on setting again by determining whether a timeout occurs in the confirmation processing for confirming the change of the automatic power-on setting. However, the method of determination is not limited thereto. For example, the determination may be made based on the number of times the processing for obtaining the automatic power-on setting (step S508) is performed, instead of the timeout. Specifically, the information processing apparatus 101 may be configured to perform step S504 again to transmit the request to enable the automatic power-on setting if the automatic power-on setting is not updated to enabled even after the processing for obtaining the automatic power-on setting (step S508) is performed an arbitrary number of times.

As described above, according to the present embodiment, the information processing apparatus 101 can enable the automatic power-on setting of the communication apparatus 151 by transmitting the request to enable the automatic power-on setting to the communication apparatus 151 by GATT communication. The user of the information processing apparatus 101 can thus enable the automatic power-on setting, for example, without approaching the communication apparatus 151 and operating the operation panel of the communication apparatus 151.

With the automatic power-on setting thus enabled, the power supply to the short-range wireless communication unit 157 can be maintained and the short-range wireless communication unit 157 enters the advertising state even if the power of the communication apparatus 151 is off when BLE communication is performed again after the processing illustrated in FIG. 5. With the short-range wireless communication unit 157 in the advertising state, the short-range wireless communication units 110 and 157 can establish a BLE connection state therebetween and can perform GATT communication. If GATT communication is available, the information processing apparatus 101 can transmit an arbitrary request to the communication apparatus 151. By using this function, the short-range wireless communication unit 110 can transmit a request to power on the communication apparatus 151 to the short-range wireless communication unit 157. Receiving the request, the communication apparatus 151 can switch on the power of the communication apparatus 151.

In such a manner, the power of the communication apparatus 151 can be switched on by GATT communication. This can power on the communication apparatus 151 without the user's operation on the communication apparatus 151, and allow use of the functions of the communication apparatus 151 with improved usability.

The processing illustrated in FIG. 5 may be performed upon each connection of BLE communication with the communication apparatus 151. The processing may be performed only when a BLE connection with the communication apparatus 151 is established for the first time. More specifically, the enabling of the automatic power-on setting may be requested on condition that the BLE connection with the communication apparatus 151 is established for the first time. In such a case, the processing illustrated in FIG. 5 is performed for the first BLE connection with the communication apparatus 151 even if the information processing apparatus 101 has already established a BLE connection with another communication apparatus.

Whether a BLE connection is established for the first time can be determined, for example, by a method using pairing. Specifically, the determination is made based on information about the communication apparatus 151. For example, if pairing is performed by the input of the PIN code 221 described with reference to FIGS. 4A and 4B, the BLE connection is determined to be established for the first time. On the other hand, if a link key corresponding to the one stored in the communication apparatus 151 is stored in the information processing apparatus 101 in advance and pairing is performed by using the link key, the connection is determined to be established for the second or subsequent time. Another determination method may use identification information about the communication apparatus 151 to establish the BLE connection with. Specifically, if a BLE connection is established, the information processing apparatus 101 obtains and stores identification information, such as a MAC address, a serial number, and a name, from the communication partner apparatus by GATT communication. If such identification information about the communication apparatus for which a BLE connection is instructed by the user is not stored, the BLE connection can be determined to be established for the first time.

The processing for enabling the automatic power-on setting by BLE communication, illustrated in FIG. 5 may be performed based on the content of instructions given by the user from the print application before a BLE connection. For example, the information processing apparatus 101 may perform the foregoing enabling processing if the user specifies a predetermined function using BLE communication before a BLE connection. The information processing apparatus 101 may skip the enabling processing if a BLE connection is established with a function other than the predetermined function specified. An arbitrary function such as a handover function is set as the foregoing predetermined function. The processing illustrated in FIG. 5 can be performed each time a BLE connection is established with such a predetermined function specified. The processing may be performed only if a BLE connection is established for the first time with a specific printer and a predetermined function specified.

To specify the communication apparatus 151 to establish a BLE connection with, for example, the information processing apparatus 101 receiving advertising information presents the printer originating the advertising information as a connection candidate to the user. The user then instructs the information processing apparatus 101 to establish a BLE connection with the printer. If the information processing apparatus 101 receives a plurality of pieces of advertising information, the information processing apparatus 101 presents a plurality of printers to the user. The user selects the printer to establish a BLE connection from the printers. Advertising information may include, for example, part or all of identification information about an apparatus, manufacturer information indicating the manufacture of the apparatus, and model information about the apparatus. Based on such pieces of information in the advertising information, the information processing apparatus 101 may present only printers or certain models of printers as BLE connection candidates to the user by using the print application.

As described above, the processing for enabling the automatic power-on setting is performed only when a BLE connection is established for the first time. For example, the automatic power-on setting can thereby be automatically enabled if the communication apparatus 151 has an initial setting "the automatic power-on setting: disabled". If the automatic power-on setting is intentionally disabled by the user afterward, the automatic power-on setting will not be automatically enabled by subsequent BLE connections. The setting intended by the user can thus be maintained.

Figure 7A:
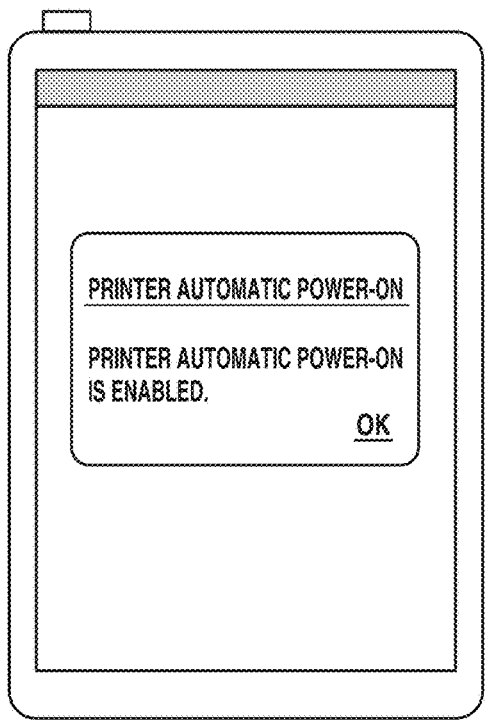
FIGS. 7A and 7B are diagrams illustrating screens displayed in automatic setting processing of the automatic power-on setting.
Figure 7B:
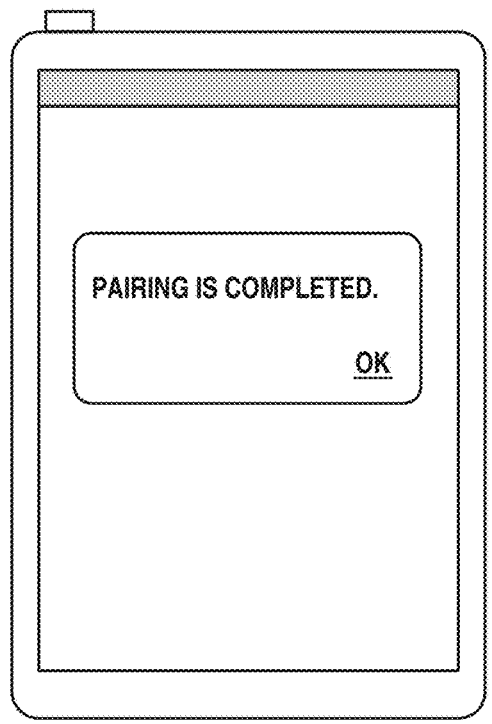

The information processing apparatus 101 may display a screen illustrated in FIG. 7A on the display unit 108 to notify the user that the automatic power-on setting is automatically enabled. The screen can be displayed at various display timings. For example, the screen can be displayed at timing when pairing of a BLE connection is completed and GATT communication is started in step S501. The screen can be displayed before the completion of the pairing. In any case, the screen illustrated in FIG. 7A may be displayed before or after a screen notifying the completion of the pairing, illustrated in FIG. 7B.

The screen illustrated in FIG. 7A may be configured so that the user can reject the automatic enabling of the automatic power-on setting. In such a case, the processing of step S502 and subsequent steps in FIG. 5 is not performed.

FIG. 6 illustrates a processing flowchart for establishing a network connection by the BLE communication method and obtaining capability information about a printer. In the processing illustrated in FIG. 6, the information processing apparatus 101 and the printer establish a BLE connection. The processing of FIG. 5 has already been performed during a previous BLE connection (for example, first BLE connection). The automatic power-on setting of the printer is therefore enabled, and the printer is capable of BLE communication even when powered off. Before the processing illustrated in FIG. 6, the user has instructed the print application to obtain capability information.

Here, a case of transmitting and receiving a job by a handover will be described as an example. The handover is a technique in which the apparatuses to perform communication initially exchange connection information for performing communication of a high-speed communication method by using a short-range communication method, and then switch to the high-speed communication method and perform data transmission and reception. In the present embodiment, BLE is used as the short-range communication method, and Wi-Fi is used as the high-speed communication method. GATT communication (bidirectional communication enabled by establishing a BLE connection between the apparatuses) has a communication speed lower than that of Wi-Fi communication. Efficient data transfer can therefore be achieved by using GATT communication to perform authentication between the apparatuses and exchange connection information for Wi-Fi communication, and by transferring large volume data (here, job) by Wi-Fi communication of high communication speed. The communication methods used for a handover are not limited to the foregoing, and various communication methods may be used as the short-distance communication method and the high-speed communication method. For example, the connection information for Wi-Fi communication can be exchanged by near-field communication (NFC) or Wi-Fi Aware communication, and then data can be exchanged by Wi-Fi communication. The processing illustrated in FIG. 6 is implemented by the CPU 103 executing programs stored in the ROM 104, such as the print application and the OS, on the RAM 105 serving as a work memory. The communication apparatus 151 is described to be a printer which prints an image on a printing medium. The printer is capable of scanning a document.

In step S601, the information processing apparatus 101 performs BLE connection processing to perform GATT communication with the printer. This BLE connection processing is similar to the foregoing BLE connection processing and includes pairing.

In step S602, the information processing apparatus 101 performs GATT communication with the BLE-connected printer, and obtains (receives) printer information from the printer. The printer information includes state information indicating the current power state of the printer and types of connection information about the network settings of the printer. The connection information is used for a Wi-Fi connection between the information processing apparatus 101 and the communication apparatus 151. Specifically, the connection information may include (1) the MAC address of the printer, (2) a service set identifier (SSID) and a password of the printer during an access point (AP) mode, (3) the current network enabled state of the printer, and (4) status information about the printer. The AP mode is a mode in which, even in the absence of an AP, the printer itself has an AP function and establishes a wireless LAN connection with a host terminal as if the host terminal is connecting to an AP. The information processing apparatus 101 and the printer establish a peer-to-peer (P2P) connection in the AP mode, whereby the information processing apparatus 101 can instruct the printer to perform printing and scanning. The network enabled state is information indicating a usable communication method among wireless LAN communication, wired LAN communication, AP mode communication, and Wi-Fi Direct communication which the communication unit of the printer implements. The status information about the printer is information indicating an error status of the printer, such as no ink, and whether the printer is in a job execution state like during printing. States in which the printer is unable to obtain capability information, like an error state, will be referred to collectively as a busy state.

In step S603, the information processing apparatus 101 checks the current power state of the printer based on the printer information obtained in step S602. In a case where the power state of the printer is off (NO in step S603), the processing proceeds to step S604. In a case where the power state of the printer is on (YES in step S604), the processing skips step S604.

In step S604, the information processing apparatus 101 transmits a request for automatic power-on to the printer by GATT communication. Since the power of the printer is switched on by this step, the information processing apparatus 101 can change the network settings and obtain the capability information in subsequent steps. After the processing of step S604, the information processing apparatus 101 can obtain (receive) the printer information by processing similar to that of step S602. For example, if the printer updates the connection information when shifting from the power-off state to the power-on state, the information processing apparatus 101 can obtain the latest information by obtaining the printer information again after step S604. The information processing apparatus 101 can obtain information about the power state in step S602, and obtain other information such as Wi-Fi connection information after step S604.

In step S605, the information processing apparatus 101 checks whether (1) the MAC address of the printer, obtained in step S602, is included in capability information about registered printers. The capability information about printers registered by the application (print application) is previously stored in the ROM 104 of the information processing apparatus 101. In step S605, the information processing apparatus 101 determines whether the MAC address obtained in step S602 is included in the previously-stored capability information. If the MAC address is included in the capability information, the capability information about the BLE-connected printer has already been obtained as that of a registered printer by the application. The processing of step S609 and subsequent steps can therefore be skipped to reduce processing. In a case where the BLE-connected printer is a registered printer (YES in step S605), the processing proceeds to step S606.

In step S606, the information processing apparatus 101 checks whether the BLE-connected printer is a selected printer that is selected by the print application among the registered printers. In a case where the BLE-connected printer is not a selected printer (NO in step S606), the processing proceeds to step S607. The user can select the selected printer as one to be used from now on from among the registered printers on a selection screen provided by the print application.

In step S607, the information processing apparatus 101 sets the BLE-connected registered printer as the selected printer. Since the printer to obtain the capability information from is considered to be used by the user from now on, the information processing apparatus 101 automatically sets the registered printer as the selected printer. The selected printer is thereby automatically changed without the user making an operation to change the selected printer. In step S608, the information processing apparatus 101 disconnects the BLE connection with the printer.

In step S609, the information processing apparatus 101 checks whether the printer is in the busy state, based on the printer information obtained in step S601. The print application is unable to obtain capability information from a printer in the busy state. In a case where the printer is in the busy state (YES in step S609), the processing proceeds to step S610. In step S610, the information processing apparatus 101 presents to the user an error indicating that the processing for obtaining capability information is unable to be continued and a message that the busy state needs to be solved.

In step S611, the information processing apparatus 101 performs broadcast within the network by Wi-Fi and detects a printer that matches (1) the MAC address of the printer, obtained in step S602. In a case where the printer is successfully detected (YES in step S611), the processing proceeds to step S619. In step S619, the information processing apparatus 101 disconnects the BLE connection. In step S620, the information processing apparatus 101 obtains the capability information about the printer from the printer by Wi-Fi. That the information processing apparatus 101 can detect the printer in step S611 means that the printer and the information processing apparatus 101 are already connected to the same network. The printer and the information processing apparatus 101 can thus communicate without performing handover processing of step S612 and subsequent steps. The processing of step S612 and subsequent steps is therefore skipped, whereby the time to complete the acquisition of the capability information can be reduced.

In step S611, in a case where no printer is successfully detected (NO in step S611), the processing proceeds to step S612. In step S612, the information processing apparatus 101 checks whether a Wi-Fi setting of the information processing apparatus 101 is disabled. In a case where the Wi-Fi setting is disabled (YES in step S612), the processing proceeds to step S613. In step S613, the information processing apparatus 101 enables its own Wi-Fi setting. The information processing apparatus 101 stores information indicating that the Wi-Fi setting is enabled into a memory, such as the RAM 105 of the information processing apparatus 101, by using the print application. Since such information is stored, the information processing apparatus 101 can restore its own Wi-Fi setting to disabled again in step S622 to be described below. Depending on the OS configuration of the information processing apparatus 101, a wireless LAN router that was previously connected and is connectable may be automatically reconnected by the enabling of the Wi-Fi setting. After the storing of the foregoing information is completed, the processing proceeds to step S611 again. If the printer is successfully connected in step S611, it means that the information processing apparatus 101 failed to communicate because the Wi-Fi setting of the information processing apparatus 101 was disabled when the step S611 was first performed.

In step S612, in a case where the Wi-Fi setting of the information processing apparatus 101 is determined to be enabled (NO in step S612), the processing proceeds to step S614. In step S614, the information processing apparatus 101 checks whether the printer is in the AP mode, based on (3) the current network enabled state of the printer obtained in step S602. In a case where the printer is in the AP mode (Yes in step S614), the processing proceeds to step S615. In step S615, the information processing apparatus 101 instructs the printer, by GATT communication by using the print application, to maintain the current network state. The printer prohibits network changes of the printer until instructed by the print application to cancel the maintenance of the network. This can prevent the network of the printer from being changed while the print application performs processing for connecting the information processing apparatus 101 in the AP mode.

In step S614, in a case where the printer is determined to not be in the AP mode (NO in step S614), the processing proceeds to step S616. In step S616, the information processing apparatus 101 instructs the printer, via GATT communication by using the print application, to enter the AP mode. If the printer detects the instruction to enter the AP mode, the printer performs processing for entering the AP mode (referred to as forced AP mode). The printer maintains the forced AP mode until instructed by the print application to end the forced AP mode. This can prevent the network of the printer from being changed while the print application performs processing for connecting the printer in the forced AP mode. Entering the forced AP mode, the information processing apparatus 101 stores information indicating that the network state of the printer is changed to the forced AP mode by the present processing, into a memory, such as the RAM 105. Since such information is stored, the information processing apparatus 101 can instruct the printer to end the forced AP mode of the printer by Wi-Fi communication in step S622 to be described below.

In step S617, the information processing apparatus 101 establishes connection with the printer in the AP mode by using (2) the SSID and password of the printer during the AP mode, obtained in step S602, and establishes a P2P state by the Wi-Fi connection. If the Wi-Fi setting of the information processing apparatus 101 is changed to establish the connection in the AP mode in step S617, then in step S618, the information processing apparatus 101 stores the state before the change into a memory, such as the RAM 105. For example, if the information processing apparatus 101 has been connected with a wireless LAN router other than in the AP mode, the information processing apparatus 101 stores the SSID of the wireless LAN router before the execution of the present processing. Since such a state is stored, the Wi-Fi setting of the information processing apparatus 101 can be re-set to the wireless LAN router in step S622 to be described below.

In step S619, the information processing apparatus 101 disconnects the BLE connection with the printer because BLE communication is not to be performed in this processing. In step S620, the information processing apparatus 101 obtains the capability information about the printer by Wi-Fi communication. The obtained capability information is stored into a memory such as the RAM 105 of the information processing apparatus 101, and the printer is set as the selected printer.

In step S621, the information processing apparatus 101 checks whether various types of information to be stored in steps S613, S616, and S618 are stored in the memory of the information processing apparatus 101, such as the RAM 105. In a case where any of the pieces of information is stored (YES in step S621), the processing proceeds to step S622. In step S622, the information processing apparatus 101 restores the information processing apparatus 101 and the printer to their respective original network states. If the information indicating that the Wi-Fi setting is enabled is stored in step S613, then in step S622, the information processing apparatus 101 restores its own Wi-Fi setting to disabled. If the information indicating that the network state of the printer is changed to the forced AP mode is stored in step S616, the information processing apparatus 101 performs processing for cancelling the forced AP mode of the printer. Specifically, the information processing apparatus 101 instructs the printer to end the forced AP mode of the printer by Wi-Fi communication. If the SSID is stored in step S618, the information processing apparatus 101 connects to the SSID by Wi-Fi communication. The information processing apparatus 101 can thereby reconnect to the wireless LAN router connected before step S617.

Figure 8:
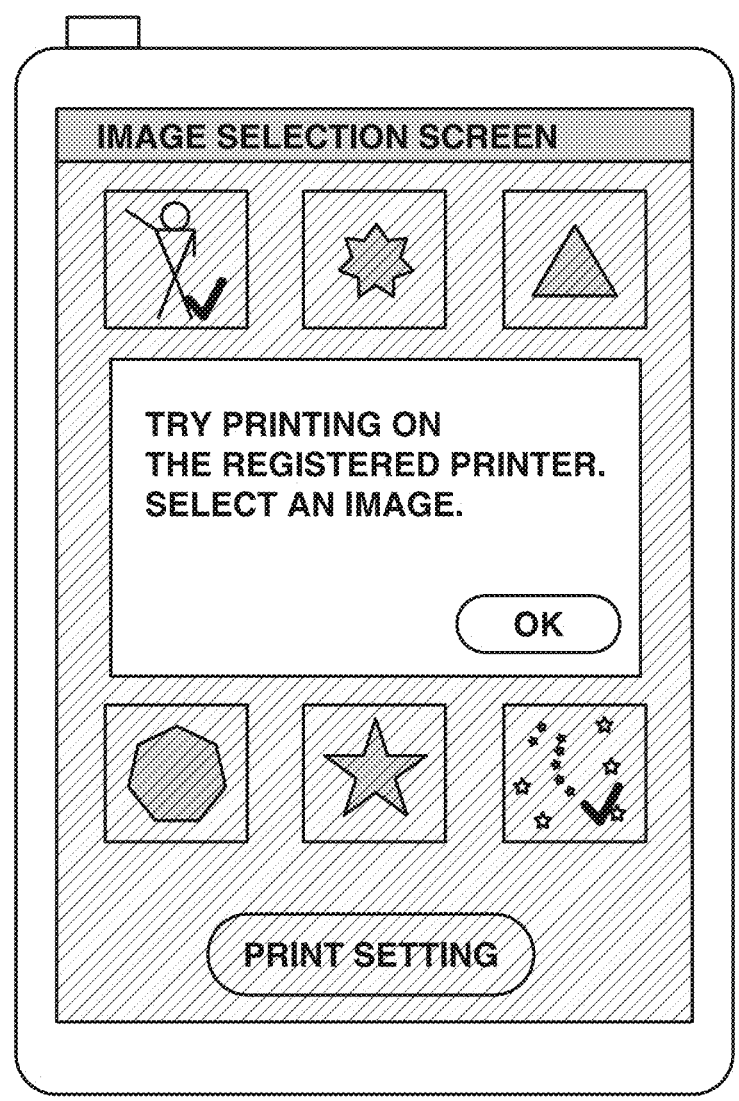
FIG. 8 is a diagram illustrating a screen displayed in photo printing.

In step S623, the information processing apparatus 101 determines whether the selected printer is changed in step S607 or S620. In a case where the selected printer is changed (YES in step S623), the processing proceeds to step S624 since the information processing apparatus 101 is connected to the selected printer for the first time. In step S624, the information processing apparatus 101 displays a screen for photo printing, illustrated in FIG. 8. The display in step S624 can guide the user on UI operations for photo printing by the printer.

As described above, according to the processing of FIG. 6, the information processing apparatus 101 and the printer can establish a connection by BLE communication through fewer steps of network change. The user can therefore obtain the capability information about the printer more easily. Since the automatic power-on setting is enabled by the processing of FIG. 5, the communication apparatus 151 (printer) here is capable of BLE communication even in the power-off state. The user can thus power on the printer by BLE communication and obtain the capability information about the printer without approaching the printer and making operations such as pressing the power key.

According to the processing illustrated in FIG. 6, even if the communication apparatus 151 is subjected to the forced AP mode, the forced AP mode ends automatically after the acquisition of the capability information. For example, suppose that the information processing apparatus 101 and the communication apparatus 151 have been connected to the Internet via Wi-Fi before the forced AP mode. In such a case, the above-mentioned automatic end processing of the forced AP mode can prevent the state in which the Internet connection is disconnected by the forced AP mode from continuing needlessly even after the acquisition of the capability information.

In the example illustrated in FIG. 6, Wi-Fi is described to be used to obtain the capability information. However, other processing is also applicable. For example, in step S620, the information processing apparatus 101 can make the printer perform print processing via Wi-Fi.

In the present embodiment, the communication apparatus 151 is described by using a printer as an example. However, the processing according to the present embodiment can be applied to a digital camera that includes Wi-Fi connection and P2P connection functions. Specifically, if the information processing apparatus 101 functions as a remote controller of the digital camera, the information processing apparatus 101 can make an operation for releasing the shutter of the connected digital camera. The information processing apparatus 101 may function as a remote controller of an apparatus, such as a network audio player and a video recorder. The present embodiment can thus facilitate a BLE connection with the information processing apparatus 101 even if applied to an apparatus other than a printer. In addition, the automatic end processing of the forced AP mode can prevent the state in which the Internet connections of the apparatuses are disconnected from continuing needlessly.

In the present embodiment, the AP mode is described as an example of the P2P connection between the information processing apparatus 101 and the communication apparatus 151. However, other P2P connection methods, such as a Bluetooth connection and a Wi-Fi Direct connection, can be used. If such connection methods cause a disconnection of the Internet connection of both or either one of the information processing apparatus 101 and the communication apparatus 151, the automatic end processing of the forced AP mode can prevent the state in which the Internet connections of the apparatuses are disconnected from continuing needlessly.

In the foregoing embodiment, the power-off state and the power-on state are described as examples of the state of the communication apparatus 151, and the automatic power-on setting is described as an example of the setting of the communication apparatus 151. However, this is not restrictive. Possible states of the communication apparatus 151 may include a power saving mode and a normal mode. Possible settings of the communication apparatus 151 may include an automatic restoration setting from the power saving mode to the normal mode.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. It will of course be understood that this invention has been described above by way of example only, and that modifications of detail can be made within the scope of this invention.

This application claims the benefit of Japanese Patent Application No. 2017-072376, filed Mar. 31, 2017, which is hereby incorporated by reference herein in its entirety.

What is claimed is:

1. An information processing method to be performed by an information processing apparatus configured to communicate with a communication apparatus by a predetermined communication method, the communication apparatus being capable of performing communication by the predetermined communication method when in a first state or a second state having power consumption lower than that of the first state, and the communication apparatus being not capable of performing communication by the predetermined communication method when in a third state, the information processing method comprising:

obtaining information from the communication apparatus in the first state by the predetermined communication method, the information indicating whether a first setting is made or a second setting is made, wherein the first setting is a setting as a result of which the communication apparatus in the first state enters the second state when a predetermined state change occurs in the communication apparatus, and a second setting is a setting as a result of which the communication apparatus in the first state enters the third state when a predetermined state change occurs in the communication apparatus; and requesting, in a case where the obtained information indicates that the second setting is made, the communication apparatus in the first state to make the first setting by the predetermined communication method, wherein in a case where the obtained information indicates that the first setting is made, the second setting is not requested to the communication apparatus is not requested by the information processing apparatus to make the second setting.

2. The information processing method according to claim 1, wherein the predetermined state change is a power-off.

3. The information processing method according to claim 2,
wherein the obtaining includes obtaining a setting about whether an automatic power-on function is enabled, the automatic power-on function allowing the communication apparatus powered off to be automatically powered on by communication with the information processing apparatus, and wherein the first setting is a setting in which the automatic power-on function is enabled, and the second setting is a setting in which the automatic power-on function is disabled.

4. The information processing method according to claim 2, further comprising:

receiving state information about a state of the communication apparatus from the communication apparatus by the predetermined communication method after the requesting; and in a case where the state information corresponding to the power-off is received, instructing the communication apparatus to power on the communication apparatus by the predetermined communication method.

5. The information processing method according to claim 1, further comprising:

receiving connection information for establishing a connection with the communication apparatus by another communication method different from the predetermined communication method; and connecting with the communication apparatus by the another communication method based on the received connection information.

6. The information processing method according to claim 5, wherein the information processing apparatus receives capability information about the communication apparatus connected in the connecting via the another communication method.

7. The information processing method according to claim 1, wherein the requesting to make the first setting is performed in a case where the communication by the predetermined communication method is established for a predetermined function which is executed using the communication by the information processing apparatus and the communication apparatus and is specified by a user.

8. The information processing method according to claim 1, further comprising determining, based on information about the communication apparatus, whether the communication with the communication apparatus by the predetermined communication method is performed for a first time,
wherein the requesting is performed on condition that the communication by the predetermined communication method is determined to be performed for the first time.

9. The information processing method according to claim 1, wherein the predetermined communication method is Bluetooth Low Energy (BLE).

10. The information processing method according to claim 1, wherein the communication apparatus is a printer configured to print an image.

11. An information processing apparatus configured to communicate with a communication apparatus by a predetermined communication method, the communication apparatus being capable of performing communication by the predetermined communication method when in a first state or a second state having power consumption lower than that of the first state, and the communication apparatus being not capable of performing communication by the predetermined communication method when in a third state, the information processing apparatus comprising:
at least one processor;
at least one memory storing one or more programs that, when executed by the at least one processor, causes the information processing apparatus to perform operations comprising:
obtaining information from the communication apparatus in the first state by the predetermined communication method, the information indicating whether a first setting is made or a second setting is made,
wherein the first setting is a setting as a result of which the communication apparatus in the first state enters the second state when a predetermined state change occurs in the communication apparatus, and
a second setting is a setting as a result of which the communication apparatus in the first state enters the third state when a predetermined state change occurs in the communication apparatus; and
making, in a case where the obtained information indicates that the second setting is made, a request to the communication apparatus in the first state to make the first setting by the predetermined communication method,
wherein in a case where the obtained information indicates that the first setting is made, the communication apparatus is not requested by the information processing apparatus to make the second setting.

12. The information processing apparatus according to claim 11, wherein the predetermined state change is a power-off.

13. The information processing apparatus according to claim 12,
wherein the operations further comprise obtaining a setting about whether an automatic power-on function is enabled, the automatic power-on function allowing the communication apparatus powered off to be automatically powered on by communication with the information processing apparatus, and
wherein the first setting is a setting, as a result of which the automatic power-on function is enabled, and the second setting is a setting, as a result of which the automatic power-on function is disabled.

14. The information processing apparatus according to claim 12, wherein the operations further comprise:
receiving state information about a state of the communication apparatus from the communication apparatus by the predetermined communication method after the request, and
instructing, in a case where the state information corresponding to the power-off is received, the communication apparatus to power on the communication apparatus by the predetermined communication method.

15. The information processing apparatus according to claim 11, wherein the operations further comprise:
receiving connection information for establishing a connection with the communication apparatus by a communication method different from the predetermined communication method, and
controlling the connection with the communication apparatus by the communication method different from the predetermined communication method based on the received connection information.

16. The information processing apparatus according to claim 15, wherein the information processing apparatus receives capability information about the communication apparatus via communication connected by the connection.

17. The information processing apparatus according to claim 11, wherein the operations further comprise making the request on condition that the communication by the predetermined communication method is performed with a predetermined function specified by a user.

18. The information processing apparatus according to claim 11, wherein the operations further comprise determining, based on information about the communication apparatus, whether the communication with the communication apparatus by the predetermined communication method is performed for a first time,
wherein the information processing apparatus makes the request on condition that the communication by the predetermined communication method is determined to be performed for the first time.

19. The information processing apparatus according to claim 11, wherein the predetermined communication method is Bluetooth Low Energy (BLE).

20. The information processing apparatus according to claim 11, wherein the communication apparatus is a printer configured to print an image.

21. A non-transitory storage medium storing a program for causing an information processing apparatus to perform an information processing method for communicating with a communication apparatus by a predetermined communication method, the communication apparatus being capable of performing communication by the predetermined communication method when in a first state or a second state having power consumption lower than that of the first state, and the communication apparatus being not capable of performing communication by the predetermined communication method when in a third state, the information processing method comprising:
obtaining information from the communication apparatus in the first state by the predetermined communication method, the information indicating whether a first setting is made or a second setting is made,
wherein the first setting is a setting as a result of which the communication apparatus in the first state enters the second state when a predetermined state change occurs in the communication apparatus, and
a second setting is a setting as a result of which the communication apparatus in the first state enters the third state when a predetermined state change occurs in the communication apparatus, and requesting, in a case where the obtained information indicates that the second setting is made, the communication apparatus in the first state to make the first setting by the predetermined communication method, wherein in a case where the obtained information indicates that the first setting is made, the communication apparatus is not requested by the information processing apparatus to make the second setting.

* * * * *